United States Patent [19]

Borcea et al.

[11] Patent Number: 5,125,708
[45] Date of Patent: Jun. 30, 1992

[54] WEDGE GRIPPER

[76] Inventors: Nicky Borcea, 95 Steep Hill Rd., Weston, Conn. 06883; Alexandru D. Ionescu, 190 Sport Hill Rd., Easton, Conn. 06612

[21] Appl. No.: 702,967
[22] Filed: May 20, 1991
[51] Int. Cl.⁵ .......................... B66C 1/44; B25J 15/08
[52] U.S. Cl. .................... 294/88; 294/119.1; 901/37
[58] Field of Search ............. 294/88, 119.1, 116; 901/31, 36, 37

[56] References Cited

U.S. PATENT DOCUMENTS

| | | | |
|---|---|---|---|
| 2,876,033 | 3/1959 | Britt | 294/88 |
| 3,312,496 | 4/1967 | Boutelle et al. | 294/88 X |
| 4,211,123 | 7/1980 | Mack | 901/37 X |
| 4,593,948 | 6/1986 | Borcea et al. | 294/119.1 X |
| 4,624,043 | 11/1986 | Bennett | 901/37 X |
| 4,723,806 | 2/1988 | Yuda | 294/119.1 |
| 4,913,481 | 4/1990 | Chin et al. | 294/119.1 X |

FOREIGN PATENT DOCUMENTS

| | | | |
|---|---|---|---|
| 141126 | 4/1980 | Fed. Rep. of Germany | 294/88 |
| 1553380 | 3/1990 | U.S.S.R. | 901/37 |

Primary Examiner—Margaret A. Focarino
Assistant Examiner—Dean J. Kramer
Attorney, Agent, or Firm—Paul A. Fattibene; Arthur T. Fattibene

[57] ABSTRACT

A gripper for use in automation or robitics having a centrally located pin improving precision. A double wedge type gripper having sliding inclined surfaces is used in combination with a piston for forcing the gripper fingers open and closed. A pin slides within a bore in the double wedge increasing the precision obtainable in the positioning or placement of a part. Additionally, wear and centrality are improved.

2 Claims, 2 Drawing Sheets

WEDGE GRIPPER

The present invention relates generally to automated mechanical gripping devices, and more specifically to a double wedge type parallel gripper having improved precision.

BACKGROUND OF THE INVENTION

In order to remain competitive in many areas of manufacturing, it is often necessary to automate. This automation is accomplished by many mechanical devices. A very common device that has many applications in automation is a gripper. Commonly, a gripper is a mechanical device that has parallel fingers that open and close to grasp an item. One such gripper device is disclosed in U.S. Pat. No. 4,509,783 entitled "Smart Hand" and issuing to Ionescu on Apr. 9, 1985, which is herein incorporated by reference. Because the fingers are cantilevered in order to grasp an item, it is often difficult to maintain the necessary precision for a specific application. In many instances, the parts used in assembling the gripper must be manufactured to very close tolerances in order to obtain the necessary precision in gripping. This is often difficult and costly to accomplish. Additionally, through time and use, the precision of the gripper may be lost due to wear. In many gripper designs, it is difficult to maintain centrality in the movement of the fingers when one of the fingers strikes an item to be grasped before the other finger. Therefore, the fingers may not close simultaneously or equally, causing inaccuracies in positioning or placement of the item. Therefore, there is a need to improve the precision of gripper devices.

SUMMARY OF THE INVENTION

The present invention is a parallel fingered gripper for use in automation comprising a pair of housings having parallel inclined surfaces and a center wedge having a double pair of parallel inclined surfaces adapted to mate with the inclined surfaces on the pair of housings. A finger is attached to each housing. The center wedge is located between the housings and is moved up and down causing the housings to open and close. A pin is used to guide the center wedge, improving the precision of the gripper assembly. The pin and a bore within the center wedge are made more easily to close tolerances, thereby improving the overall precision of the gripper.

Accordingly, it is an object of the present invention to provide an improved gripper having good precision.

It is an advantage of the present invention that wear is minimized due to the reduced twisting forces on a piston.

It is another advantage of the present invention that centrality between the fingers of the gripper is improved.

It is a feature of the present invention that a pin extends into the center wedge.

These and other objects, advantages, and features will become more readily apparent in view of the following more detailed description.

DETAILED DESCRIPTION OF THE PREFERRED EMBODIMENT

Figure 1:
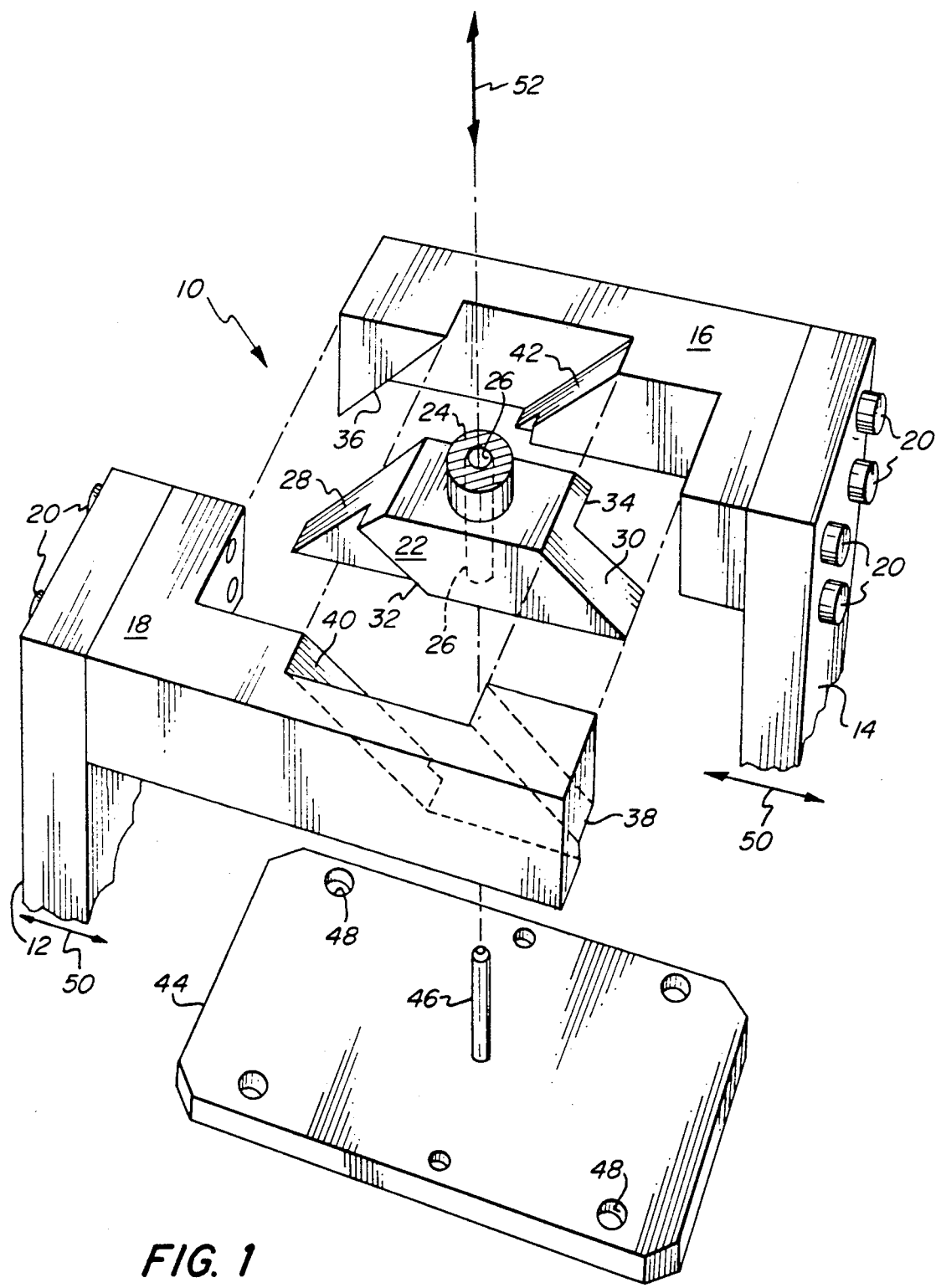
FIG. 1 is an exploded perspective view of a portion of the invention.

FIG. 1 illustrates the present invention. A double wedge gripper 10 is generally illustrated. A left finger 12 and a right finger 14 are attached to a left wedge housing 18 and a right wedge housing 16 respectively. The fingers 12 and 14 are attached to the housings 16 and 18 by bolts 20. The fingers 12 and 14 can be attached to a specialized tool (not shown) for a particular application. Between the housings 16 and 18 is placed a center double wedge 22. Attached to center wedge 22 is a shaft 24 having a bore 26 therein. The center wedge 22 has a first top wedge inclined surface 28 and a second top wedge inclined surface 30. The center wedge 22 also has a first bottom wedge inclined surface 32 and a second bottom wedge inclined surface 34. Surfaces 28 and 34 are parallel to each other and surfaces 30 and 32 are parallel to each other. The two pairs of parallel surfaces 28, 34 and 30, 32 are transverse to each other. The surfaces 28, 30, 32, and 34 are inclined relative to an axis perpendicular to the bore 26 by an angle of approximately 45 degrees. However, this angle may vary between 25 degrees and 65 degrees. The right housing 16 has two inclined surfaces thereon, a first bottom inclined surface 36 and a second top inclined surface 42. Analogously, the left housing 14 has two inclined surfaces thereon, a first top inclined surface 40 and a second bottom inclined surface 38. The inclined surfaces are adapted to mate as follows: Inclined surface 28 mates with inclined surface 36; and inclined surface 42 mates with inclined surface 34; and inclined surface 30 mates with inclined surface 38; and inclined surface 40 mates with inclined surface 32. Plate 44 has a perpendicular pin 46 extending therefrom. Pin 46 has a diameter closely matching the diameter of bore 26. The manufacture of the pin and bore 26 can be made easily to closer tolerances than the other parts of the gripper assembly. Thereby, the overall precision of the gripper device can be improved. Plate 44 is held in position by bolts passing through holes 48 therein. The bolts and structure to which they attach are not shown for convenience of illustration. The plate 44 with pin 46 attached is positioned underneath the center double wedge 22 such that pin 46 is positioned within bore 26.

The operation of the present invention can readily be understood with reference to FIG. 1 and arrows 50 and 52. Arrows 50 illustrate the direction of motion of the fingers 12 and 14. Arrow 52 illustrates the direction of motion of the double wedge 22. Therefore, when double wedge 22 is raised upward by pulling on shaft 24, the fingers 12 and 14 are forced to come closer together. Conversely, as shaft 24 is forced downward, the fingers 12 and 14 are forced away from each other. Pin 46 maintains contact within bore 26 for the entire range of motion of center double wedge 22.

Figure 2:
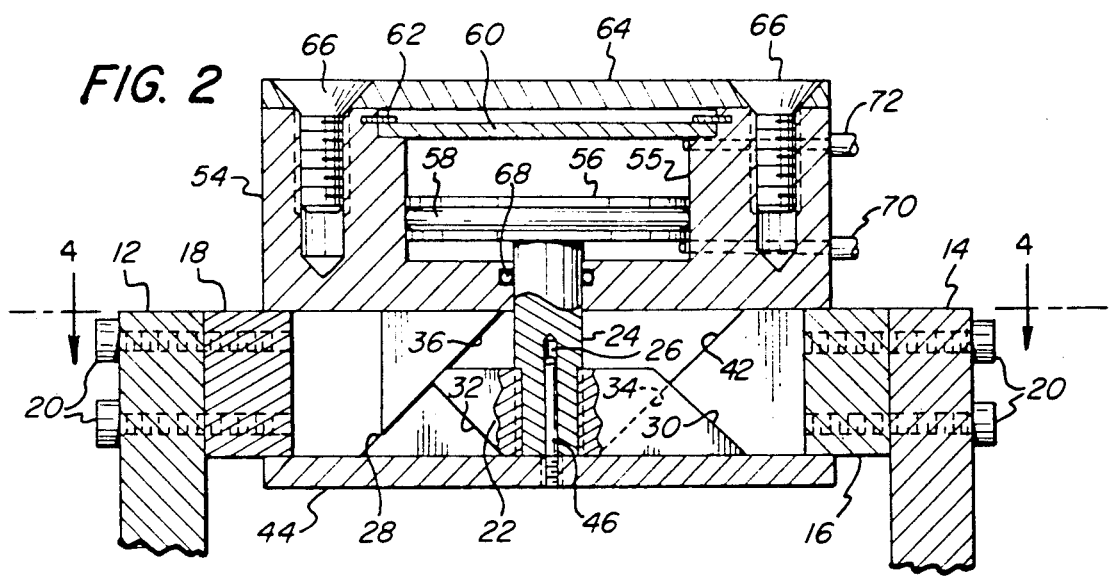
FIG. 2 is a cross-section illustrating the open position of the present invention.
Figure 3:
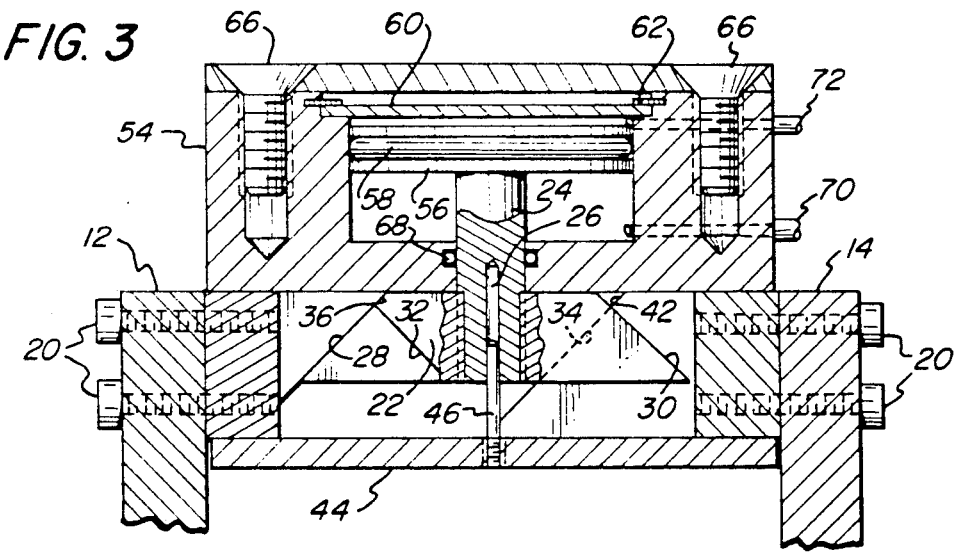
FIG. 3 is a cross-section illustrating the closed position of the present invention.

FIGS. 2 and 3 illustrate the movement of the double wedge 22 in combination with the pin 46 causing the fingers 12 and 14 to open and close. The fingers 12 and 14 are forced to open and close by the movement up and down of the double wedge 22. This movement of double wedge 22 is caused by a piston 56. Piston 56 is attached to shaft 24, which in turn is attached to double wedge 22. The piston 56 is contained within the cylinder 55 within piston housing 54. A ring seal 58 seals the perimeter of the piston 56 along the interior surface of cylinder 55. A cover 60 retains the piston 56 within the cylinder 55. Retaining ring 62 holds piston cover 60 in position. The piston housing 54 is further covered by housing cover 64 attached by screws 66. A shaft seal 68 is used to seal the interior of cylinder 55. The piston 56 is moved within the cylinder 55 by fluid pressure entering at closed port 70 or opening port 72. When pressurized fluid is permitted to enter closing port 70, the piston 56 is forced to move upward, pulling with it the double wedge 22 and forcing the double wedge 22 to bear on inclined surfaces 28, 36 and 30, 38. This forces the fingers 12 and 14 to close as illustrated in FIG. 3. When pressurized fluid is forced to enter opening port 72, the piston 56 is forced downward, forcing double wedge 22 downward bearing on surfaces 40, 32 and 42, 34, forcing the fingers 12 and 14 apart.

Referring to FIGS. 2 and 3, pin 46 can clearly be seen in contact within bore 26 throughout the entire range of motion of double wedge 22. The use of pin 46 helps reduce twisting forces on the shaft 24. This eliminates excessive wear and aids in precision of the gripper assembly. Additionally, the pin 46 helps the fingers 12 and 14 to close equally, even when one of the fingers 12, 14 strikes a part before the other. The precision with which a part can be positioned has improved tenfold with the use of pin 46 over that of a gripping apparatus not having the pin 46. For example, a typical part can be positioned within 0.0050 inches with a gripper assembly not having the pin 46 as illustrated. Yet, when pin 46 is used with a gripper device as illustrated, the positioning of a part improves to 0.0005 inches. The pin 46, therefore, greatly facilitates and improves the precision of a gripper device as used in automation or robotics.

Figure 4:
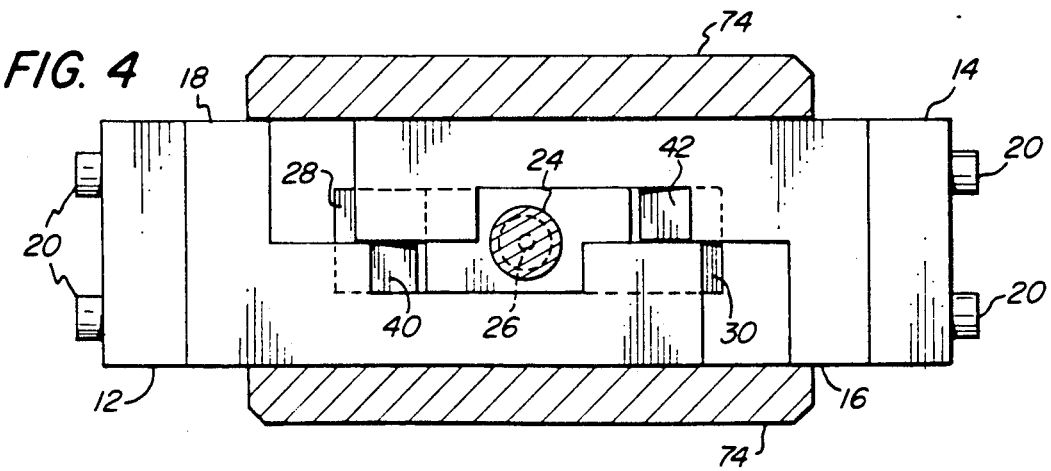
FIG. 4 is a cross-section taken along line 4—4 in FIG. 2.

FIG. 4 better illustrates the inclined surfaces 28, 30, 40, and 42 used to open and close the fingers 12 and 14. FIG. 4 also illustrates side housing 74, which is used to retain the housing assemblies 16 and 18, as well as providing an attachment support for plate 44.

From the above, it should be readily appreciated that the addition of pin 46 to a gripper device utilizing a double wedge greatly improves the precision with which a part can be positioned. Therefore, a precision in placement is achieved that could not ordinarily be accomplished in other gripper devices not incorporating the present invention. The use of the present invention advances the art of automation without unduly adding to the manufacturing costs of a gripper device. The manufacturing costs may actually be reduced by permitting increased tolerances in the other components of the assembly without compromising the resulting precision of the assembly as a whole.

Although the preferred embodiment has been illustrated and described, it will be obvious to those skilled in the art that various modifications may be made without departing from the spirit and scope of this invention.

What is claimed is:

1. A mechanical gripper assembly for use in robotics comprising:
   a first housing;
   a first finger attached to said first housing;
   a first inclined surface on said first housing;
   a second inclined surface on said first housing parallel to said first inclined surface;
   a second housing;
   a second finger attached to said second housing;
   a third inclined surface on said second housing;
   a fourth inclined surface on said second housing parallel to said third inclined surface;
   a wedge having a bore therein, said wedge fitting between said first and second housings;
   a fifth inclined surface on one side of said wedge slidably engaging said fourth inclined surface;
   a sixth inclined surface on the one side of said wedge parallel to said fifth inclined surface slidably engaging said third inclined surface;
   a seventh inclined surface on the other side of said wedge slidably engaging said first inclined surface;
   an eighth inclined surface on the other side of said wedge parallel to said seventh inclined surface slidably engaging said second inclined surface;
   a shaft connected to said wedge;
   a piston connected to said shaft;
   a piston housing having a cylinder therein containing said piston;
   a piston cover fit over the cylinder;
   a pressurized fluid closing port entering the cylinder on one side of said piston;
   a pressurized fluid opening port entering the cylinder on the other side of said piston;
   a plate mounted adjacent said first and second housings; and
   a pin extending perpendicularly from said plate closely fitting within the bore, said pin maintaining contact with said wedge throughout the entire range of motion of said wedge.

2. A mechanical gripper as in claim 1 wherein:
   said first, second, third, fourth, fifth, sixth, seventh, and eighth inclined surfaces form an angle with the axis of the bore of substantially 45 degrees.

* * * * *